Figure 1:
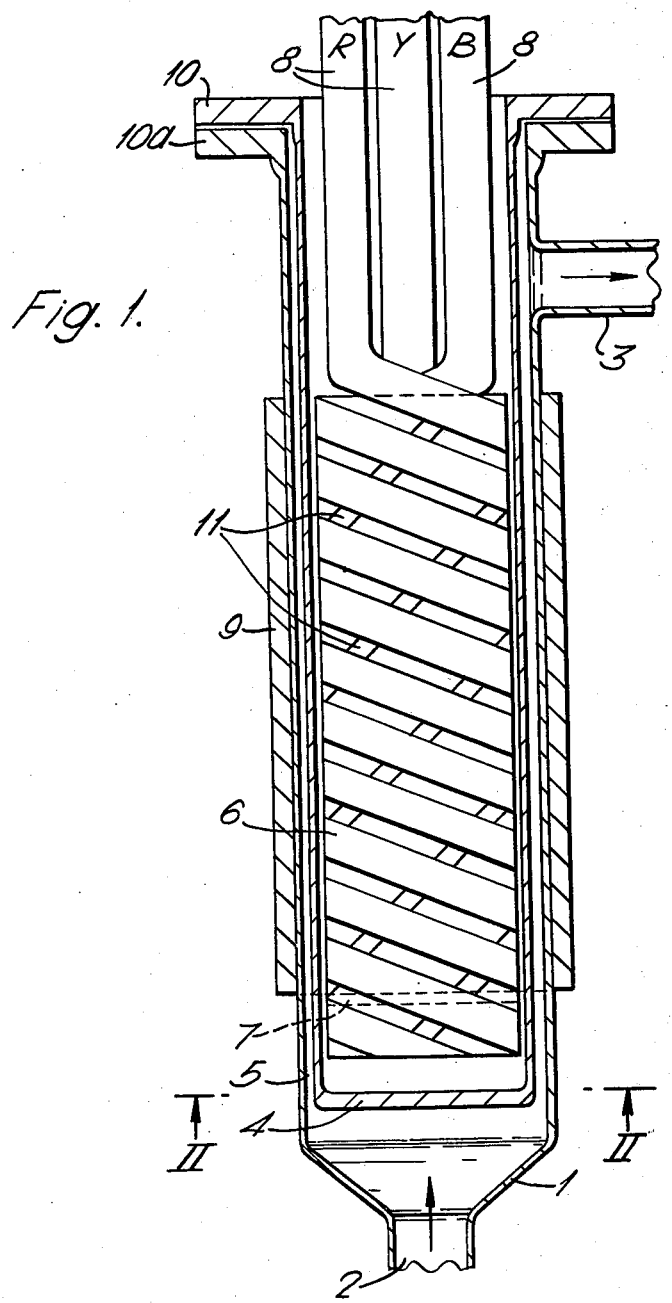

United States Patent [19]
Davidson

[11] 3,885,890
[45] May 27, 1975

[54] ELECTROMAGNETIC PUMPS

[75] Inventor: Daniel Fraser Davidson, Altrincham, England

[73] Assignee: United Kingdom Atomic Energy Authority, London, England

[22] Filed: Apr. 2, 1973

[21] Appl. No.: 346,933

[30] Foreign Application Priority Data
Apr. 26, 1972 United Kingdom............... 19490/72

[52] U.S. Cl. ................................................. 417/50
[51] Int. Cl. ............................................. H02n 4/20
[58] Field of Search ....................................... 417/50

[56] References Cited
UNITED STATES PATENTS

| | | | |
|---|---|---|---|
| 2,786,416 | 3/1957 | Fenemore............................. | 417/50 |
| 2,905,089 | 9/1959 | Blake..................................... | 417/50 |
| 3,147,711 | 9/1964 | Blake..................................... | 417/50 |
| 3,187,672 | 6/1965 | Baker..................................... | 417/50 |
| 3,251,302 | 5/1966 | Baker..................................... | 417/50 |
| 3,275,859 | 9/1966 | Meyerand, Jr. et al............... | 417/50 |
| 3,372,644 | 3/1968 | Nilson................................... | 417/50 |

Primary Examiner—William L. Freeh
Attorney, Agent, or Firm—Larson, Taylor and Hinds

[57] ABSTRACT

The present specification describes and claims an electromagnetic pump suitable for use in pumping molten sodium. The pump comprises a central cylindrical core arranged coaxially in a bore within a pump casing, the surface of the core and the wall of the bore defining an annular passage therebetween. A three start helical winding is arranged coaxially with said central core, the free ends of one end of the winding being connectible to a three-phase electricity supply to thus produce an electromagnetic field within the annular passage which field can move the molten sodium along said annular passage.

4 Claims, 4 Drawing Figures

ELECTROMAGNETIC PUMPS

The present invention relates to an electromagnetic pump suitable for use in pumping molten sodium.

More particularly, the present invention relates to an annular linear induction pump which may for example be used to pump molten sodium at temperatures up to 650°C in situations where it is not possible to provide cooling. A preferred application of such a pump is as a prime mover for sodium coolant in fast nuclear reactors. Previous designs of such annular linear induction pumps have used discrete disc-shaped coils placed around the outside of a flow annulus. To produce a travelling radial field, the coils are energised from a threephase electricity supply. In such an arrangement, numbering from one end of the arrangement of coils, coils Nos. 1, 4, 7, etc. may be connected to phase 1, coil Nos. 2, 5, 8, etc. to phase 2, and coil Nos. 3, 6, 9, etc. to phase 3. Normally, each coil would have a number of turns and the coils in each phase would be connected in series to suit a high voltage, low current supply. If the number of turns per coil is reduced to one, a lower voltage, higher current supply is required which is less demanding on insulation.

The present invention obviates the necessity for joints between discrete coils and makes it possible to consider all ceramic insulations for very high temperatures. Further, the present invention simplifies the manufacture of the pump and enables the windings to be located on the inside of the flow annulus if desired.

According to the present invention there is provided an electromagnetic pump for use in pumping molten sodium, comprising an annular passage through which molten sodium can flow, and means for generating a helical electromagnetic field in the annular passage, which field is coaxial with the central axis of the annular passage to thereby move the molten sodium along said passage.

According to a further feature of the present invention there is provided an electromagnetic pump for use in pumping molten sodium comprising an outer casing, a central core arranged within a bore in the casing coaxially with the longitudinal axis of the bore, an annular flow passage provided between the core and the casing, and a three start helical winding arranged coaxially with the central core, one end of the winding being connectible to a three-phase electricity supply.

Whilst, when utilising the discrete coils as in previous designs of annular linear induction pumps, the field travels in a straight line parallel to the axis of the pump, the magnetic field in a pump constructed in accordance with the present invention, executes a helix, the direction of motion of the field being always perpendicular to the actual windings. This provides a force tending to cause rotation of the liquid, e.g. molten sodium, around the axis of the pump as well as parallel to it. If required, straight baffles may be provided in the flow annulus to prevent any such rotation. Further, however, the helical winding enables the pumps to be designed with a larger number of complete pole pitches than in previous designs and, therefore, any end losses may thus be proportionately smaller than in such previous designs.

By utilising a helical winding, there is no necessity for joints as between discrete coils and also the helical winding may be located inside of or outside of the flow annulus.

In a preferred embodiment of the present invention, a three start helical winding lies in grooves in the central iron core, the winding forming a star point towards one end of the pump and the free ends of the winding towards the other end of the pump being connectible to a three-phase electricity supply.

Although in this preferred embodiment the winding lies in helical grooves in the central iron core, thus simplifying manufacture, the helical windings may alternatively be located coaxially of the bore outside the bore or arranged on the inside wall of the bore.

In a known annular linear induction pump, the central iron core is composed of radial laminations, the plane of the laminations lying parallel to the axis of the core. Ideally, the laminations of a helically wound pump would need to follow a helix which is everywhere at right angles to the windings. This would appear to be impossible to make, so preferably a few helical slits are cut into the surface of the core to interrupt the major eddy current paths, and the additional losses must be accepted. One compensating factor is the fact that the pump is to operate at very high temperatures and the resistivity of iron is about seven times that at ambient temperatures, reducing any losses considerably. Hysteresis losses are also lower at the high temperature provided the reduced saturation flux density is not exceeded.

The central iron core of the preferred embodiment is machined with a three start helical slot or groove. The slot width is approximately twice the pole width and about equal to the slot depth, the pitch of the slot being approximately equivalent to the diameter of the core, though it may be less for large pumps. Although the pump may be quite long in some cases e.g. two or more meters, the central core may be machined in convenient lengths and joined. In manufacture, the slots are insulated and the pole faces are either masked during this operation or the insulation ground from the pole faces afterwards. The winding is in the form of flat copper strips, several strips being located in each slot, this "laminating" of a winding making it easier to wind and also reducing eddy current losses. The total thickness of copper is chosen to be less than the slot depth and at one end of the iron core, the three windings are terminated and joined together, to form a "star point." At the other end, suitable lengths of tails are left for connection to a three-phase electricity supply. The exposed surface of the copper winding is then coated with insulation.

Dependent upon whether the central iron core is to be used in a "wet replacement" or "dry replacement" arrangement, it will be respectively arranged either in a thin walled, close fitting sheath, e.g. a stainless steel tube, or a strong thimble with clearance. "Wet replacement" means that the sheath is removed with the winding and core, whilst "dry replacement" means that the winding and core are removed without breaking the sodium containment. Better performance will however always be obtained from a "wet replacement" arrangement, because the magnetic gap between the core and fluid being pumped is smaller and the losses are less than in a "dry replacement" arrangement.

Figure 2:
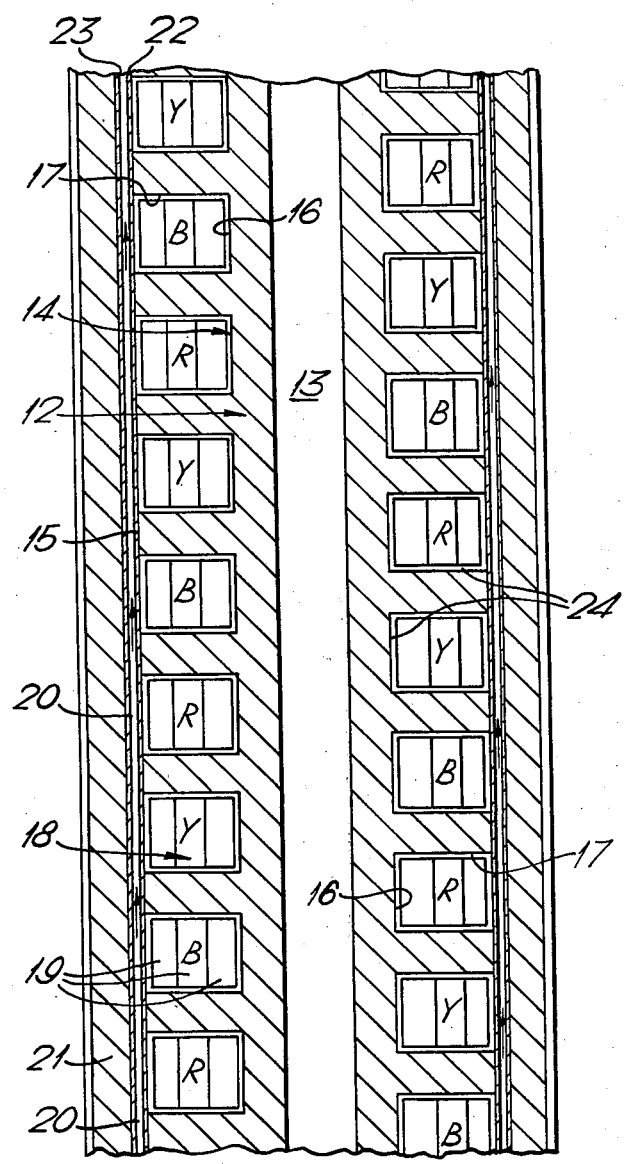
Figure 3:
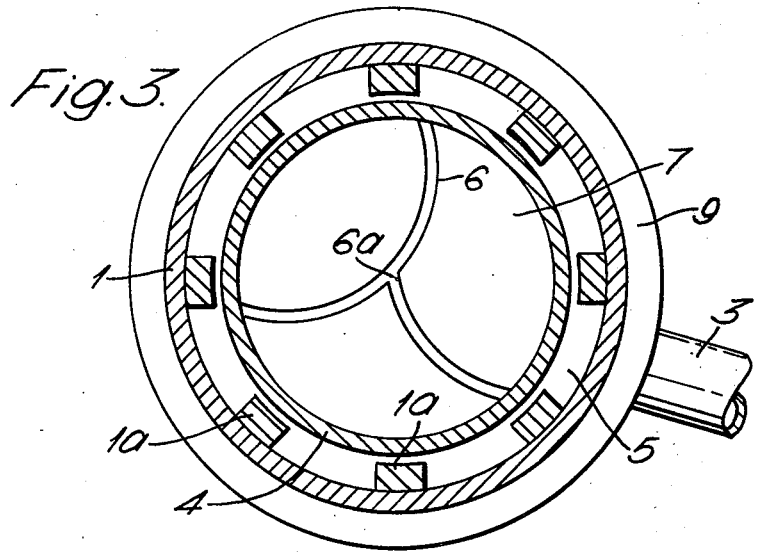
Figure 4:
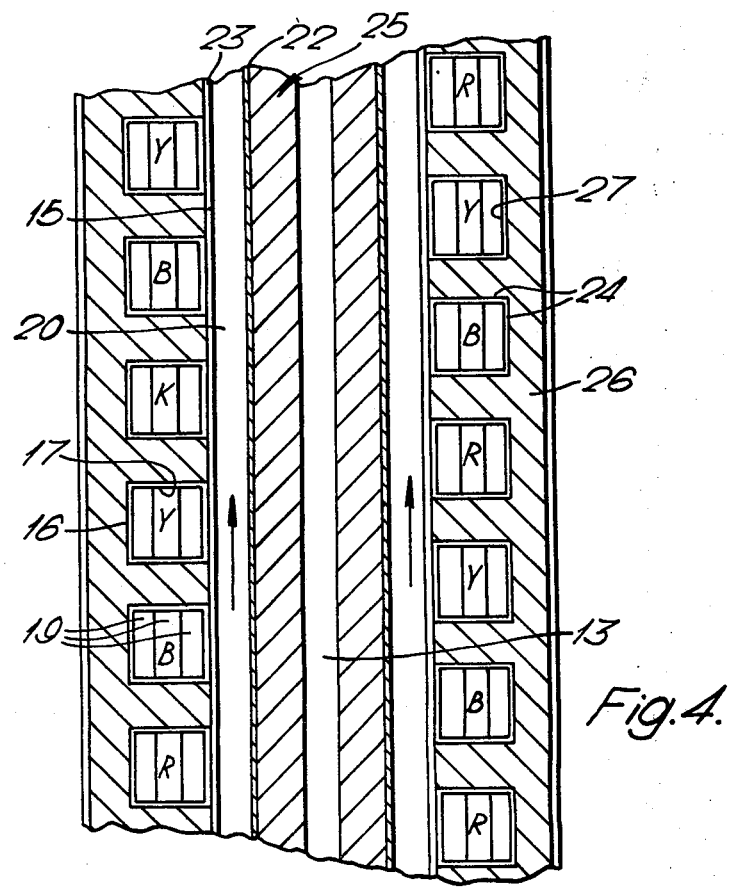

The present invention will now be further described, by way of example, with reference to the accompanying drawings, in which:

FIG. 1 is a cross sectional view of one embodiment of an electromagnetic pump constructed in accordance with the present invention, FIG. 2 is a longitudinal cross section of part of a second embodiment of an electromagnetic pump constructed in accordance with the present invention, FIG. 3 is a sectional view taken along line II—II in FIG. 1; and FIG. 4 is a longitudinal cross section of part of a third embodiment of an electromagnetic pump constructed in accordance with the present invention.

The embodiment of the annular linear induction pump illustrated in FIGS. 1 and 3, comprises an outer casing 1 having an inlet 2 and an outlet 3. Arranged in the outer casing is a thimble 4 i.e. a tube closed at its lower end and open to the outside of casing 1 at the upper end, the gap between the thimble and the outer casing providing an annular flow passage 5 through which the liquid e.g. molten sodium, can flow from inlet 2 to outlet 3. Within the thimble 4 is arranged a three start helical winding 6 which is wound around a central iron core 7. At the bottom end i.e. as viewed in FIG. 3, of the central iron core 7, the windings terminate and are joined together in a "star point" 6a. The free ends 8 of the winding at the upper end of the core, are however, left free for connection to a three-phase electricity supply. An outer iron core 9 around the casing 1 is also evident.

The thimble 4 and outer casing 1 have at their upper ends as viewed in FIG. 1, rims 10 and 10a respectively. These rims 10 and 10a sealingly engage against each other closing the outer casing 1 to the outside. Should the central core or winding require to be replaced, then this can be effected by removing the thimble and core and replacing with a new component. This is therefore a "wet replacement" arrangement.

In order to interrupt major eddy currents produced in the surface of the core 7, helical slits 11 are formed in the core surface, the path of the slits being in the opposite rotational direction to the winding 6. Ideally the slits cross the path of the winding at right angles thereto.

In operation, the magnetic field produced by the helical windings 6 moves along a helical path causing the liquid e.g. molten sodium, to move from the inlet 2 to the outlet 3 via the flow annulus 5. Baffles 1a (FIG. 3) are provided in the flow annulus 5 and take the form of elongate ribs which are fixed on the inner surface of casing 1 and extend parallel to the longitudinal axis of the pump, these baffles suppressing the rotational component given to the liquid. The baffles can alternatively be provided on the thimble 4 or be omitted from the construction so allowing helical flow.

In FIG. 2, a part of a second embodiment of electromagnetic pump is illustrated in longitudinal section. This embodiment has a central core 12 which has a central bore 13. The central core 12 has a three start helical slot 14 cut into its outer surface leaving poles 15 therebetween. The slot width is about twice the pole width and about equal to the slot depth. Also, the pitch is about the same as the diameter of the core, the bottom and sides 16 and 17 respectively, of the slot, being insulated with a coating 24 of flame sprayed alumina. During this manufacturing operation, the pole faces 15 are masked, though alternatively the alumina may be ground off the pole faces afterwards. An alternative form of insulation may be utilised e.g. Brimor cement.

The windings 18 are in the form of flat copper strips 19 which are wound or laid in the slots, several strips being located in a slot.

This "laminating" of the windings makes it easier to wind and also reduces eddy current losses, the total thickness of the copper winding being chosen to be less than the slot depth. At one end of the iron core the three windings of the helical winding which are indicated in FIG. 2 by the letters "R, Y and B," are terminated and joined together by brazing, to form a "star point" as illustrated in FIG. 3. A coating 24 of insulation is applied to the exposed surfaces of the copper windings, again making sure the pole faces 15 remain clean. The core is located in a bore in an outer iron casing 21, the bore of the casing 21 being lined by a stainless steel tube 23, and the diameter of the core 12 which is encased within a stainless steel sheath 22, being such that a small annular flow passage 20 exists between the tube and the sheath (23, 22).

When the three start helical winding is connected to a three-phase electricity supply, the magnetic field produced causes the liquid e.g. molten sodium, to move through the flow annulus 20 in the direction indicated by the arrows, thus acting as a pump. The central bore 13 in the iron core, may be used for a return flow pipe or for any other purpose desired. Possibly, the bore 13 could be used for cooling purposes.

One application of the invention is to insert a core as per the embodiment illustrated in FIG. 2 in a control rod hole in a fast reactor, the helical winding, when energised serving to pump the liquid along the hole through the annular gap between the control rod hole and the outer surface of the core.

Part of a third embodiment of electromagnetic pump, is illustrated in longitudinal section in FIG. 4. This third embodiment is similar to the second embodiment illustrated in FIG. 2 and like reference numerals have been used for equivalent components. The only difference is that the copper windings 18 are not provided in a three-start helical groove in the outer surface of the central core 25, but are provided in a three start helical groove 27 formed in the inner surface of the casing 26 i.e. effectively outside the flow annulus 20.

Baffles similar to those provided in the embodiment illustrated in FIGS. 1 and 3 can be provided if desired, in either of the embodiments illustrated in FIGS. 2 and 4, and also helical slits 11 may be provided in the embodiment in FIGS. 2 and 4 to interrupt eddy currents, though in the case of the embodiment in FIG. 4, the slits will be provided in the bore wall.

The size of the winding required, can be determined by calculation, when the required pressure gradient for the pump has been decided. Once this required pressure gradient has been decided, the magnetic field strength to produce such a pressure and hence the current required to produce such a field, can be determined. Knowing the current, the size of the winding can then be determined from heat dissipation and transfer considerations.

The choice of dimensions for the flow annulus is a compromise as a wider gap means that more current is necessary to produce the required field and a narrow gap produces a greater pressure drop or a lower velocity of flow for the liquid.

I claim:

1. An electromagnetic pump comprising a cylindrical iron core co-axially arranged within an iron casing to bound an annular flow duct for liquid metal, the core being of laminated form and having three equally spaced, external helical slots and three equally spaced helical slits, the slits being in opposite rotational direction to the slots and intersecting the slots at right angles thereto, the slots being lined with electrically insulating material and housing windings adapted for connection at one end to a three phase electricity supply and joined together by a star point connection at the other end, the windings each comprising a stack of helically wound copper laminations and having coatings of insulating material on the outer circumferential surfaces, and a closely fitting stainless steel sheath for the core and windings.

2. An electromagnetic pump according to claim 1 wherein the inner surface of the casing has elongate ribs extending parallel to the longitudinal axis of the casing.

3. An electromagnetic pump according to claim 1 wherein the slots have square cross-section and helical pitch equal to the core diameter, the spacing of the slots being equal to one half of the width of the slots.

4. An electromagnetic pump according to claim 1 wherein the core has a central flow duct extending along the longitudinal axis.

* * * * *